US011387023B2

(12) United States Patent
Yanai et al.

(10) Patent No.: US 11,387,023 B2
(45) Date of Patent: Jul. 12, 2022

(54) MULTILAYER ELECTRONIC COMPONENT PRODUCTION METHOD

(71) Applicant: Panasonic Intellectual Property Management Co., Ltd., Osaka (JP)

(72) Inventors: Ken Yanai, Hokkaido (JP); Tomokazu Yamaguchi, Osaka (JP); Yuji Yamagishi, Hokkaido (JP); Naoki Mutou, Hokkaido (JP); Sayaka Matsumoto, Hokkaido (JP); Ryosuke Usui, Hokkaido (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 327 days.

(21) Appl. No.: 16/622,572

(22) PCT Filed: Sep. 19, 2018

(86) PCT No.: PCT/JP2018/034534
§ 371 (c)(1),
(2) Date: Dec. 13, 2019

(87) PCT Pub. No.: WO2019/073762
PCT Pub. Date: Apr. 18, 2019

(65) Prior Publication Data

US 2020/0194151 A1 Jun. 18, 2020

(30) Foreign Application Priority Data

Oct. 11, 2017 (JP) ............................ JP2017-197380

(51) Int. Cl.
*H01G 7/00* (2006.01)
*H01C 17/30* (2006.01)
(Continued)

(52) U.S. Cl.
CPC ............... *H01C 17/30* (2013.01); *H01C 7/10* (2013.01); *H01C 7/18* (2013.01); *H01C 17/28* (2013.01); *Y10T 29/43* (2015.01)

(58) Field of Classification Search
CPC ........... H01G 4/30; H01G 4/232; H01G 4/12; H01G 4/248; H01G 2/12; H01G 4/1209;
(Continued)

(56) References Cited

U.S. PATENT DOCUMENTS 6,160,472 A 12/2000 Arashi et al.
6,288,887 B1 9/2001 Yoshida et al.
(Continued)

FOREIGN PATENT DOCUMENTS

CN 102683021 A 9/2012
CN 203966703 U 11/2014
(Continued)

OTHER PUBLICATIONS

English Translation of Chinese Office Action dated Jun. 3, 2021 for the related Chinese Patent Application No. 201880048740.9.
(Continued)

*Primary Examiner* — Thiem D Phan
(74) *Attorney, Agent, or Firm* — McDermott Will & Emery LLP

(57) ABSTRACT

A sintered body that includes ceramic layers and an internal electrode which are alternately stacked on one another is prepared. A first external electrode is formed on a side surface of the sintered body such that the first external electrode is connected to the internal electrode. An insulating layer is formed on a surface of the sintered body by applying a glass coating over an entire of the sintered body having the formed first external electrode. The insulating layer is exposed from the first external electrode. A second external electrode is formed on the first external electrode.
(Continued)

This method provides the produced multilayer electronic component with a stable electric connection between the internal electrodes and the external electrodes.

11 Claims, 6 Drawing Sheets

(51) Int. Cl.

| | |
|---|---|
| ***H01C 7/10*** | (2006.01) |
| ***H01C 7/18*** | (2006.01) |
| ***H01C 17/28*** | (2006.01) |

(58) Field of Classification Search

CPC ........ H01L 2924/19041; H01C 17/283; H01C 17/28; Y10T 29/435; Y10T 29/4902; Y10T 29/43; Y10T 428/24926; Y10T 156/1057; Y10T 29/49163

USPC .. 29/25.41, 25.03, 25.42, 602.1, 609, 610.1, 29/739

See application file for complete search history.

(56) References Cited

U.S. PATENT DOCUMENTS

| | | | | |
|---|---|---|---|---|
| 6,518,632 | B1 | 2/2003 | Yoshida et al. | |
| 9,053,864 | B2 * | 6/2015 | Togashi | H01G 4/30 |
| 2012/0236462 | A1 | 9/2012 | Haruki et al. | |

FOREIGN PATENT DOCUMENTS

| | | |
|---|---|---|
| JP | 8-330107 | 12/1996 |
| JP | 2000-164406 | 6/2000 |
| JP | 2000-223359 | 8/2000 |
| JP | 2000-235932 | 8/2000 |
| JP | 2000-306764 | 11/2000 |
| JP | 2015-012052 | 1/2015 |

OTHER PUBLICATIONS

International Search Report of PCT application No. PCT/JP2018/034534 dated Nov. 20, 2018.

* cited by examiner

MULTILAYER ELECTRONIC COMPONENT PRODUCTION METHOD

CROSS-REFERENCE TO RELATED APPLICATIONS

This application is a U.S. national stage application of the PCT international application No. PCT/JP2018/034534 filed on Sep. 19, 2018, which claims the benefit of foreign priority of Japanese patent application No. 2017-197380 filed on Oct. 11, 2017, the contents all of which are incorporated herein by reference.

TECHNICAL FIELD

The present invention relates to a method of producing a multilayer electronic component used in various electronic equipment.

BACKGROUND ART

Recently, there are various electronic components used as surface mount components, such, for example, as multilayer ceramic capacitors and multilayer ceramic varistors. There is a problem which does not occur in a case where the size of these electronic components is small, but which would likely occur as the size of the electronic components increases to increase capacitance or to increase current. Specifically, in a case where the size of the electronic component is increased, a mechanical stress is caused due to the difference in linear expansion coefficient between the circuit board material and the ceramic material, which would likely cause the electronic component to be broken. To avoid this problem, in some conventional electronic components, lead terminals made by machining a metal plate are attached to external terminals at both end surfaces of each electronic component, and the electronic component is mounted via these lead terminals.

A conventional electronic component similar to the above-described electronic component is disclosed in PTL 1.

CITATION LIST

Patent Literature

PTL 1: Japanese Patent Laid-Open Publication No. 2000-306764

SUMMARY

A sintered body that includes ceramic layers and an internal electrode which are alternately stacked on one another is prepared. A first external electrode is formed on a side surface of the sintered body such that the first external electrode is connected to the internal electrode. An insulating layer is formed on a surface of the sintered body by applying a glass coating over an entire of the sintered body having the formed first external electrode. The insulating layer is exposed from the first external electrode. A second external electrode is formed on the first external electrode. This method provides the produced multilayer electronic component with a stable electric connection between the internal electrodes and the external electrodes.

DESCRIPTION OF EMBODIMENTS

Figure 1A:
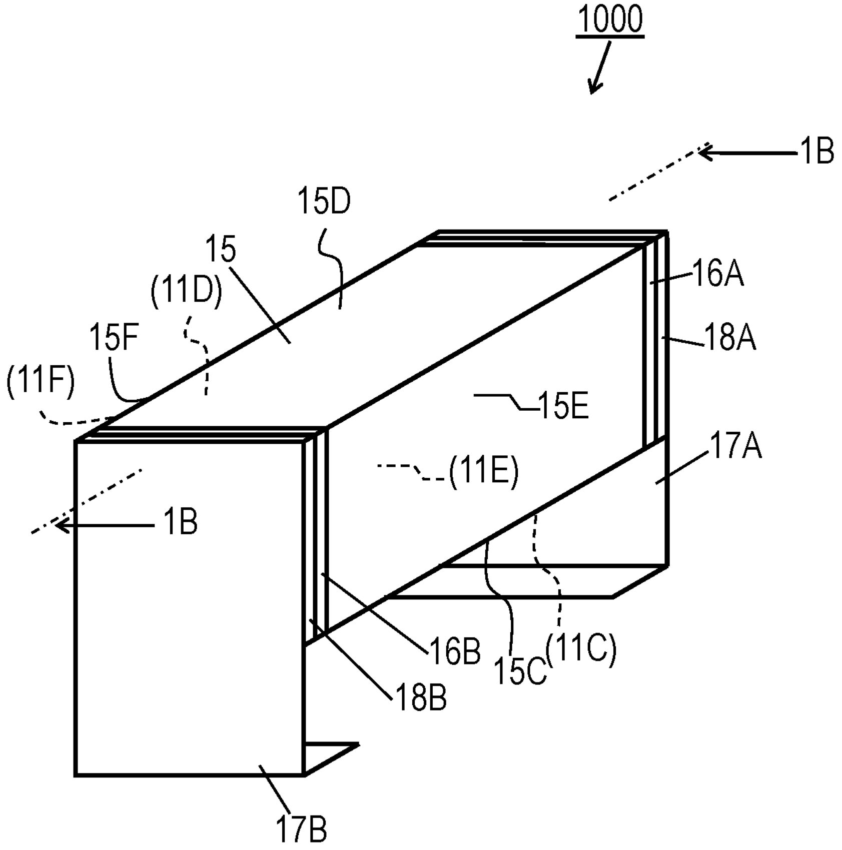
FIG. 1A is a perspective view of a multilayer electronic component according to an exemplary embodiment.
Figure 1B:
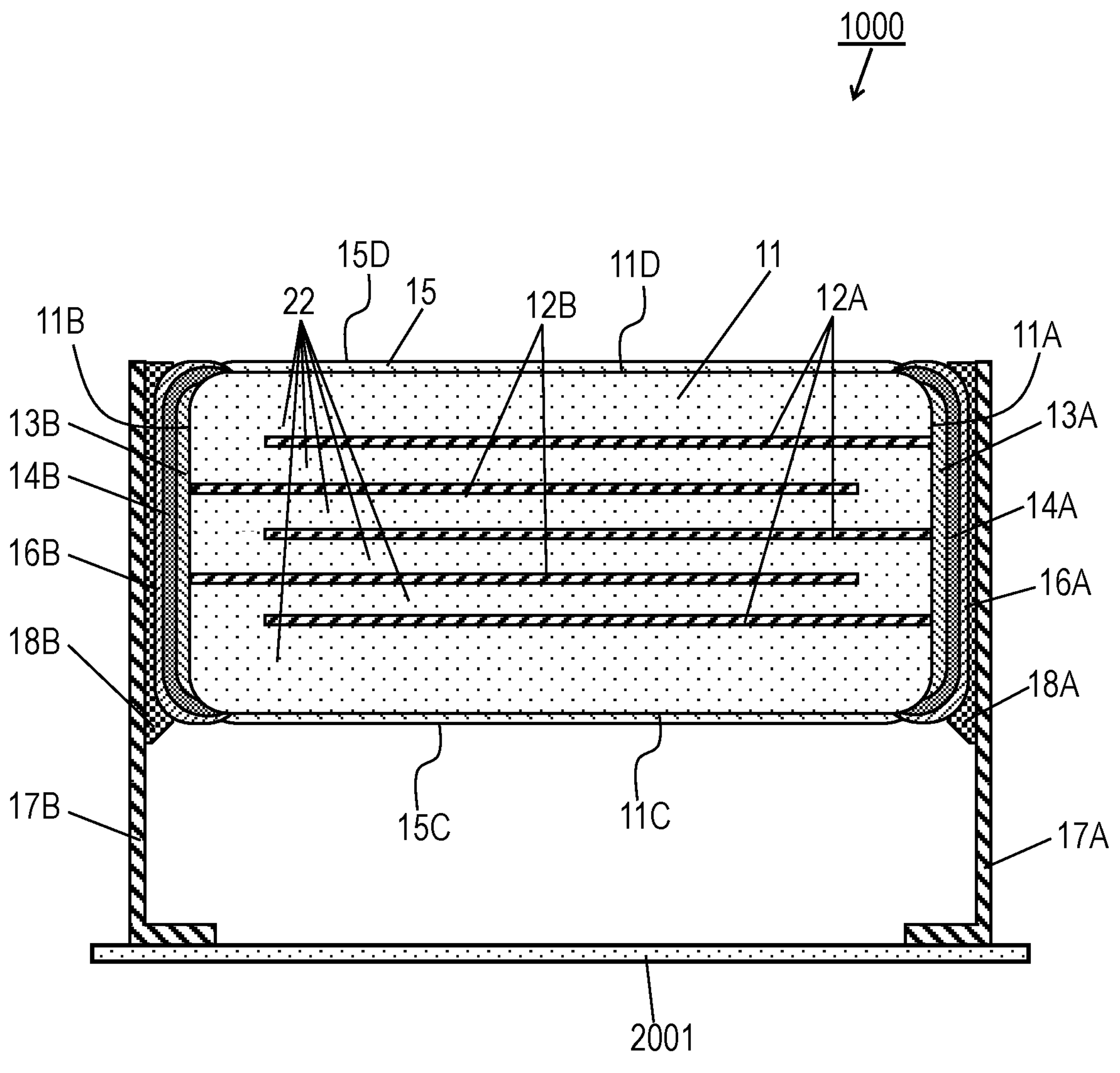
FIG. 1B is a cross-sectional view of the multilayer electronic component along line 1B-1B shown in FIG. 1A.

FIG. 1A is a perspective view of multilayer electronic component 1000 according to an exemplary embodiment. FIG. 1B is a cross-sectional view of multilayer electronic component 1000 along line 1B-shown in FIG. 1A. In accordance with the exemplary embodiment, multilayer electronic component 1000 is a multilayer ceramic varistor.

Multilayer electronic component 1000 includes sintered body 11, insulating layer 15 provided on sintered body 11, external electrodes 13A and 13B provided on sintered body 11, external electrode 14A provided on external electrode 13A, external electrode 14B provided on external electrode 13B, plated layer 16A provided on external electrode 14A, plated layer 16B provided on external electrode 14B, bonding material 18A provided on plated layer 16A, bonding material 18B provided on plated layer 16B, lead terminal 17A bonded to plated layer 16A, i.e., to external electrode 14A, with bonding material 18A; and lead terminal 17B bonded to plated layer 16B, or to external electrode 14B, with bonding material 18B. Sintered body 11 includes insulating layers 22 and internal electrodes 12A and 12B which are alternately laminated. Sintered body 11 has side surface 11A from which internal electrodes 12A are exposed, side surface 11B from which internal electrodes 12B are exposed, mount surface 11C which is connected to side surfaces 11A and 11B, opposite surface 11D which is connected to side surfaces 11A and 11B and which is opposite to mount surface 11C, surface 11E which is connected to side surfaces 11A and 11B, mount surface 11C and opposite surface 11D, and surface 11F which is connected to side surfaces 11A and 11B, mount surface 11C and opposite surface 11D and which is opposite to surface 11E. Insulating layers 15 are provided on mount surface 11C, opposite surface 11D, surface 11E, and surface 11F of sintered body 11. Multilayer electronic component 1000 is configured to be mounted on mounting body 2001, such as a circuit board, by connecting lead terminals 17A and 17B to mounting body 2001.

A method of producing multilayer electronic component 1000 will be described below. FIGS. 2 to 8 are cross-sectional views of multilayer electronic component 1000 for illustrating a method of producing multilayer electronic component 1000.

Figure 2:
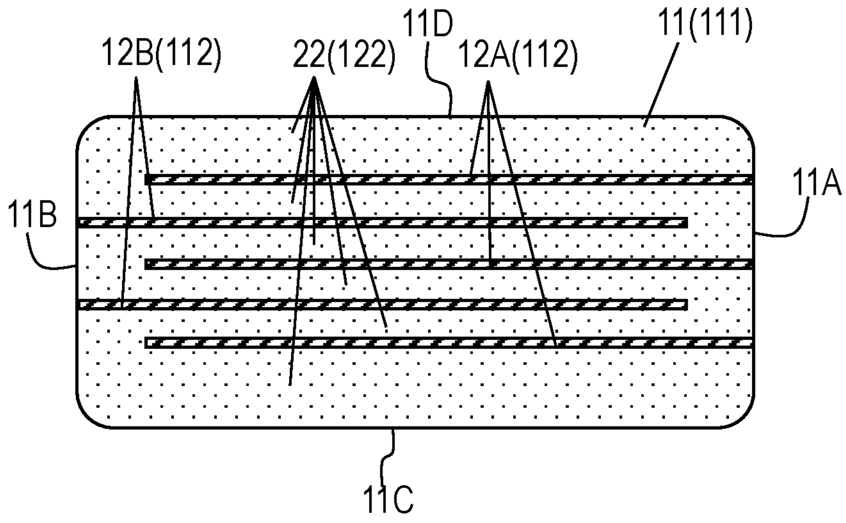
FIG. 2 is a cross-sectional view of the multilayer electronic component according to the embodiment for illustrating a method of producing the component.
Figure 3:
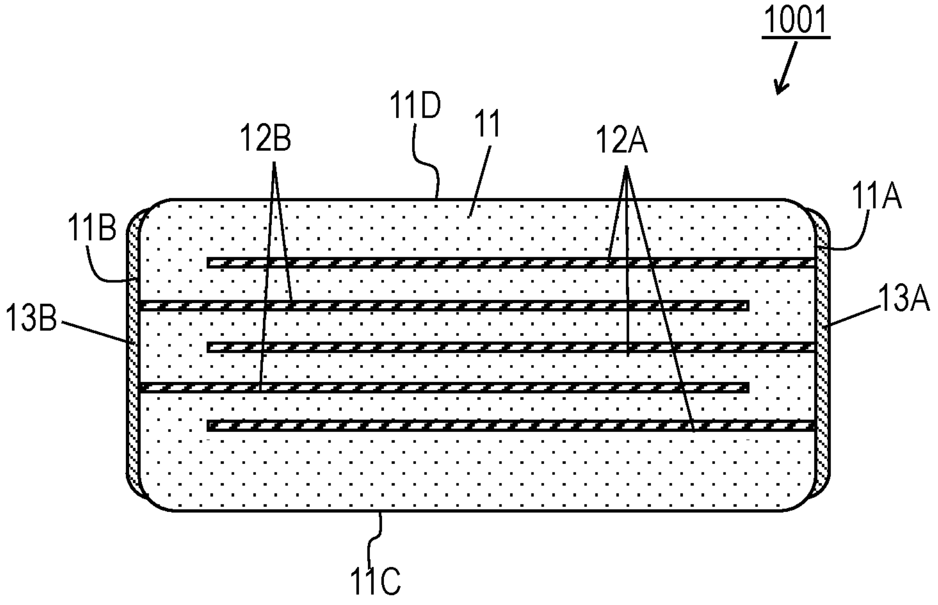
FIG. 3 is a cross-sectional view of the multilayer electronic component according to the embodiment for illustrating the method of producing the component.

A mixture material which is obtained by adding bismuth oxide or the like, plasticizer, binder or the like to zinc oxide is shaped into have a sheet shape to form plural green sheets 122. Silver powder is mixed with binder or the like to form internal electrode paste 112. Internal electrode paste 112 for internal electrodes is printed on green sheets 122, and then, green sheets 122 are laminated such that green sheets 122 and the printed layers of internal electrode paste 112 are alternately arranged. Then, the thus obtained multilayer product is divided into pieces to obtain plural multilayer bodies 111 each having a structure shown in FIG. 2. Multilayer bodies 111 are fired at 900° C. to obtain plural sintered bodies 11. In this process, green sheets 122 and internal electrode paste 112 are fired simultaneously to become insulating layers 22 and internal electrodes 12A and 12B, respectively. Sintered bodies 11 are mixed with abrasive and agitated so as to chamfer corners of each sintered body 11 and cause internal electrodes 12A and 12B to be exposed from opposite side surfaces 11A and 11B of each sintered body 11. As a result of the above-described processes, each sintered body 11 as shown in FIG. 2 is obtained. Internal electrodes 12A are not exposed from side surface 11B, and internal electrodes 12B are not exposed from side surface 11A. Each sintered body 11 has a size of 7 mm wide, 9 mm long and 3 mm high.

A conductive paste is prepared by mixing silver powder with a binder or the like. Next, sintered bodies 11 are arranged such that side surfaces 11A from which internal electrodes 12A are exposed are aligned with one another, and side surfaces 11B from which internal electrodes 12B are exposed are aligned with one another. Then, the conductive paste is printed on side surfaces 11A and 11B of each sintered body 11 so as to cover the exposed internal electrodes 12A and 12B, respectively. Then, each sintered body 11 is fired at about 800° C. so that the printed conductive paste is baked to form external electrodes 13A and 13B to obtain intermediate component 1001. In this process, external electrodes 13A and 13B directly contact internal electrodes 12A and 12B, respectively, hence providing stable electrical connection of external electrodes 13A and 13B to internal electrodes 12A and 12B. Each of external electrodes 13A and 13B has a thickness of about 20 μm. Electrical characteristics of multilayer electronic component 1000 depend on regions of insulating layers 22 sandwiched between internal electrodes 12A and 12B. The conductive paste obtained by mixing silver powder with the binder to form external electrodes 13A and 13B prevents undesired matters, such as dielectric matters, other than the conductive silver powder that would affect the electrical characteristics of multilayer electronic component 1000 from diffusing into these regions. Accordingly, stable electrical characteristics of multilayer electronic component 1000 can be obtained.

Figure 4:
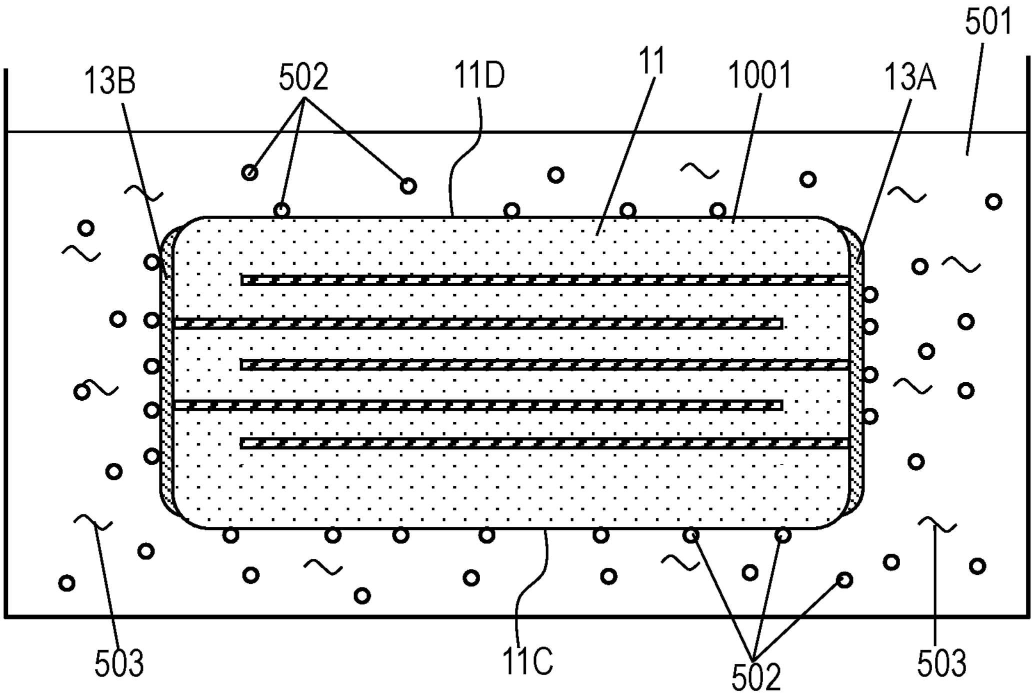
FIG. 4 is a cross-sectional view illustrating the method of producing the multilayer electronic component according to the exemplary embodiment.
Figure 5:
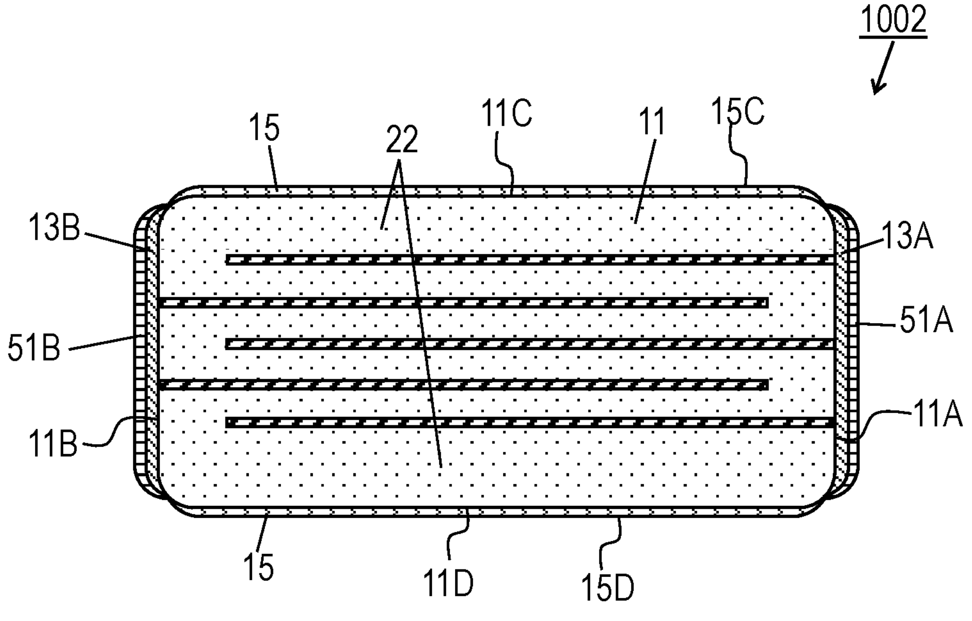
FIG. 5 is a cross-sectional view of the multilayer electronic component according to the embodiment for illustrating the method of producing the component.
Figure 6:
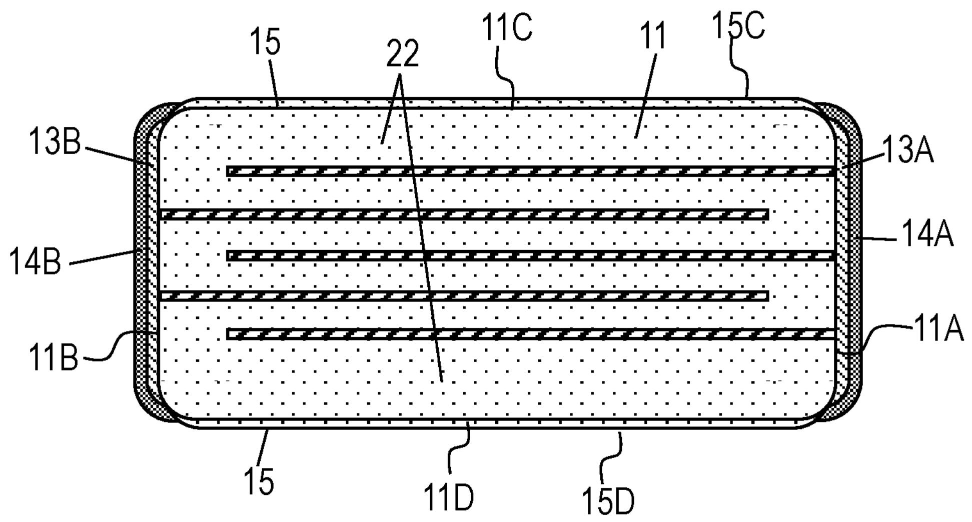
FIG. 6 is a cross-sectional view of the multilayer electronic component according to the embodiment for illustrating the method of producing the component.

As shown in FIG. 4, coating liquid 501 for glass coating is prepared. Coating liquid 501 is a suspension of silica powder 502 including, e.g. sub-micrometer-size silica powder 502 and solvent medium 503 having silica powder 502 dispersed therein. Next, as shown in FIG. 4, intermediate component 1001, or sintered body 11, having external electrodes 13A and 13B formed thereon is dipped into coating liquid 501 to apply a glass coating over an entire of intermediate component 1001. In this process, silica powder 502 is attached to surfaces of external electrodes 13A and 13B and surfaces 11C to 11F of sintered body 11 (refer to FIGS. 1A and 1B). Then, the entire of glass-coated intermediate component 1001 is heated at about 900° C. to form intermediate component 1002, as shown in FIG. 5. Silica powder 502 attached to the zinc oxide body, or surfaces 11C to 11F, of sintered body 11 reacts with zinc of zinc oxide to form stable insulating layer 15 on entire surfaces 11C to 11F of sintered body 11. Stable insulating layer 15 on entire surfaces 11C to 11F excluding external electrodes 13A and 13B and exposed from external electrodes 13A and 13B provides multilayer electronic component 1000 with reliability. In intermediate component 1002 shown in FIG. 5, silica is attached onto surfaces of external electrodes 13A and 13B to form silica layers 51A and 51B, respectively.

A mixture paste is prepared by mixing silver powder, a glass frit, and a binder or the like. Next, sintered bodies 11, or intermediate components 1002, are arranged such that the side surfaces having external electrodes 13A formed thereon are aligned with one another, and the side surfaces having external electrode 13B formed thereon are aligned with one another. Then, the mixture paste is applied onto external electrodes 13A and 13B to completely cover external electrodes 13A and 13B such that external electrodes 13A and 13B are not exposed. Then, intermediate components 1002 are fired at about 700° C. so that the applied mixture paste is baked to form external electrodes 14A and 14B shown in FIG. 6. External electrodes 14A and 14B has larger areas than external electrodes 13A and 13B, and consequently, surround external electrodes 13A and 13B, respectively. At this moment, a part of silica in silica layers 51A and 51B attached onto surfaces of external electrodes 13A and 13B are dispersed into the mixture paste, or into the glass frit in external electrodes 14A and 14B. This configuration allows external electrodes 13A and 13B to be electrically connected with external electrodes 14A and 14B reliably. A preferable method of applying the mixture paste to external electrodes 13A and 13B is a printing method, but a dip coating method may also be used. In the case of the dip coating method, however, the mixture paste is preferably applied substantially only onto the side surfaces of intermediate component 1002.

Since the silver paste containing a glass frit is employed to form external electrodes 14A and 14B, external electrodes 14A and 14B can be fixed to external electrodes 13A and 13B and sintered body 11 with a sufficient fixing strength.

Figure 7:
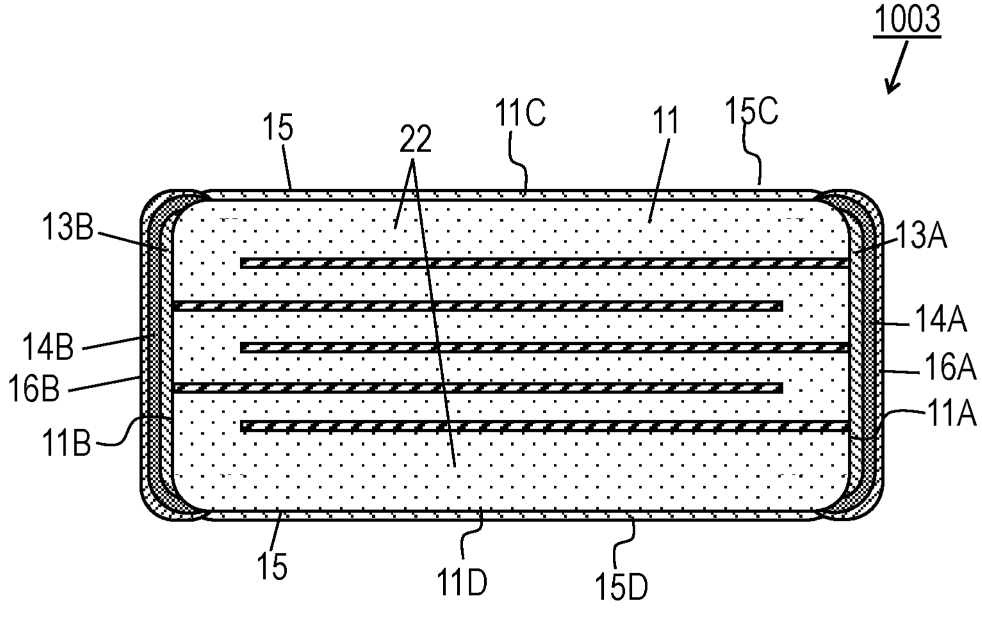
FIG. 7 is a cross-sectional view of the multilayer electronic component according to the embodiment for illustrating the method of producing the component.

Next, plated layers 16A and 16B are formed on external electrodes 14A and 14B, respectively, by electroplating to form individual component 1003, as shown in FIG. 7. Each plated layer 16A (16B) has a double-layer structure constituted by a nickel plated layer formed on external electrode 14A (14B) and a tin plated layer formed on the nickel plated layer. In accordance with the embodiment, the nickel plated layer has a thickness of about 3 μm, and the tin plated layer has a thickness of about 5 μm.

Figure 8:
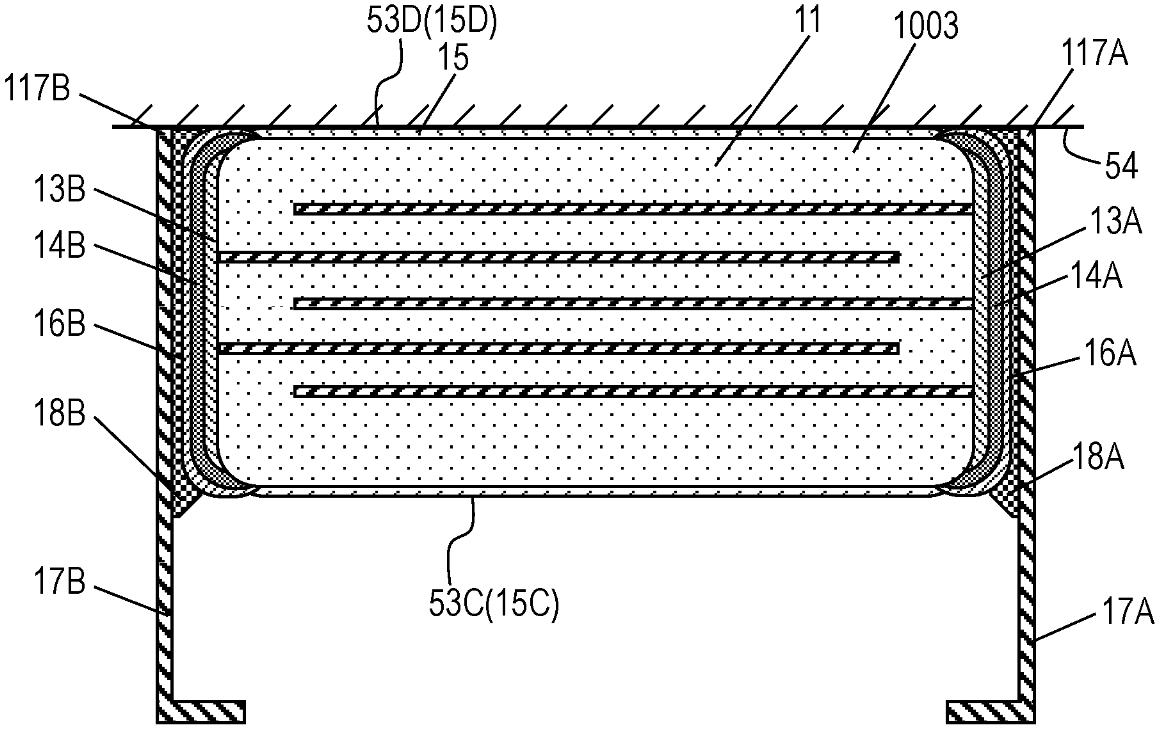
FIG. 8 is a cross-sectional view of the multilayer electronic component according to the embodiment for illustrating the method of producing the component.

Lead terminals 17A and 17B are prepared by pressing a plate of iron or phosphor bronze to have predetermined shapes and then folding the punched plates to have an L-shape. Each of lead terminals 17A and 17B is coated with a plated layer of nickel and tin, and are respectively provided with bonding layers 18A and 18B made of bonding material, such as solder, on regions which configured to contact external electrodes 14A and 14B. Next, as shown in FIG. 8, lead terminals 17A and 17B are connected to plated layers 16A and 16B, i.e., to external electrodes 14A and 14B, respectively. Multilayer electronic component 1000 with the lead terminals can be obtained by placing lead terminals 17A and 17B so that bonding layers 18A and 18B contact external electrodes 14A and 14B, respectively, and heating bonding layers 18A and 18B with laser beam or the like to melt the solders of bonding layers 18A and 18B so that lead terminals 17A and 17B are connected to external electrodes 14A and 14B, respectively. The printing method forming external electrodes 13A and 13B and external electrodes 14A and 14B allows surfaces of external electrodes 14A and 14B (plated layers 16A and 16B) contacting lead terminals 17A and 17B to be flat. Accordingly, bonding layers 18A and 18B wet and spread along lead terminals 17A and 17B from side surfaces 11A and 11B to expand beyond mount surface 11C of sintered body 11 toward mounting body 2001. This configuration disperses stresses from lead terminals 17A and 17B, enhancing the reliability of multilayer electronic component 1000.

Individual component 1003 shown in FIGS. 7 and 8 has mounting surface 53C and opposite surface 53D which is opposite to mounting surface 53C configured to face mounting body 2001, such as a circuit board, when multilayer electronic component 1000 is mounted onto mounting body 2001. In a process of connecting lead terminals 17A and 17B to external electrodes 14A and 14B, individual component 2001 is placed so that opposite surface 53D faces downward and contacts reference surface 54, and respective ends 117A and 117B of lead terminals 17A and 17B contact reference surface 54 to be aligned with opposite surface 53D. In this condition, lead terminals 17A and 17B are connected to external electrodes 14A and 14B. This method provides external electrodes 14A and 14B such that almost no part of external electrodes 14A and 14B contact opposite surface 53D. Accordingly, the above-described alignment allows lead terminals 17A and 17B to be reliably attached to predetermined positions, thus allowing multilayer electronic component 1000 to be mounted accurately and easily.

In a case where a position error is produced during attaching lead terminals to the above-described conventional electronic component, a problem described below would occur when the electronic component is mounted on a circuit board. The conventional surface mount electronic component with lead terminals is produced by attaching the lead terminals to ordinary surface mount electronic components. In order to mount the electronic component on a circuit board, electrodes are formed on the mount surface of the electronic component by a dipping method or the like. Accordingly, the electrodes are formed not only on the mount surface, but also on other surfaces, such as an upper surface and side surfaces of the electronic component. When the lead terminals are attached to the electronic component with reference to the outer shape of the electronic component, position errors may be produced due to thickness variations of the electrodes.

On the other hand, multilayer electronic component 1000 according to the embodiment is mounted on mounting body 2001 accurately and easily.

In a process of positioning lead terminals 17A and 17B, individual component 1003 contacts reference surface 54 at a part which is opposite to mounting surface 53C and farthest from mounting surface 53C. In individual component 1003 shown in FIG. 8, plated layers 16A and 16B contact reference surface 54. In accordance with the embodiment, in order to surely prevent positional variations of lead terminals 17A and 17B which are likely to be caused due to variations of sintered body 11, insulating layer 15 is provided preferably on a side opposite to mounting surface 53C and farther from mounting surface 53C than external electrodes 14A and 14B are.

REFERENCE MARKS IN THE DRAWINGS

11 sintered body
12A, 12B internal electrode
13A, 13B external electrode (first external electrode)
14A, 14B external electrode (second external electrode)
15 insulating layer
16A, 16B plated layer
17A, 17B lead terminal
18A, 18B bonding layer

The invention claimed is:

1. A method of producing a multilayer electronic component, comprising:

providing a sintered body including an internal electrode therein;

forming a first external electrode on a side surface of the sintered body such that the first external electrode is connected to the internal electrode, the first external electrode containing silver and not containing glass frit;

forming an insulating layer on a part of a surface of the first external electrode and on a surface of the sintered body which is exposed from the first external electrode, the insulating layer containing glass; and forming a second external electrode on the first external electrode via the insulating layer, the second external electrode containing silver and glass frit.

2. The method of claim 1, wherein said forming of the first external electrode comprises forming the first external electrode on the side surface of the sintered body by a printing method.

3. The method of claim 2, wherein said forming of the second external electrode comprises forming the second external electrode on the first external electrode via the insulating layer by a printing method.

4. The method of claim 1, wherein said forming of the first external electrode comprises applying a conductive paste containing silver on the side surface of the sintered body, and wherein said forming of the second external electrode comprises applying a mixture paste containing silver and glass frit on the first external electrode.

5. The method of claim 4, wherein said forming of the second external electrode further comprises baking the mixture paste applied on the first external electrode.

6. The method of claim 4, wherein said forming of the insulating layer comprises dipping the sintered body having the formed first external electrode into a suspension of silica powder so as to form the insulating layer such that silica remains on a surface of the first external electrode, and wherein said forming of the second external electrode further comprises applying the mixture paste on the surface of the first external electrode on which the silica remains.

7. The method of claim 4, wherein said forming of the first external electrode further comprises baking the applied conductive paste.

8. The method of claim 1, further comprising connecting a lead terminal to the second external electrode.

9. The method of claim 8, wherein said forming the second external electrode comprises providing an individual component which includes the sintered body, the insulating layer, the first external electrode, and the second external electrode, wherein the individual component has a mount surface, and an opposite surface opposite to the mount surface, the mount surface being configured to face a mounting body when the multilayer electronic component is mounted on the mounting body, and wherein said connecting of the lead terminal to the second external electrode comprises:

positioning the lead terminal by aligning an end of the lead terminal with the opposite surface of the individual component; and connecting the positioned lead terminal to the second external electrode.

10. A multilayer electronic component comprising:

a sintered body including an internal electrode provided therein;

a first external electrode provided on a side surface of the sintered body, the first external electrode being connected to the internal electrode, the first external electrode containing silver and not containing glass frit;

an insulating layer provided on a part of a surface of the first external electrode and on a surface of the sintered body which is exposed from the first external electrode, the insulating layer containing glass; and a second external electrode provided on the first external electrode via the insulating layer, the second external electrode containing silver and glass frit, wherein at lease a part of the glass contained in the insulating layer is diffused into the second external electrode.

11. The multilayer electronic component of claim 10, wherein the insulating layer contains silica.

* * * * *